(12) United States Patent
Aliprantis et al.

(10) Patent No.: US 10,284,127 B2
(45) Date of Patent: May 7, 2019

(54) SYSTEMS AND METHODS FOR REDUCING DC-LINK OSCILLATIONS

(71) Applicants:Purdue Research Foundation, West Lafayette, IN (US); Deere & Company, Moline, IL (US)

(72) Inventors: Dionysios Aliprantis, West Lafayette, IN (US); Guozhen Zhou, Fargo, ND (US); Ayesha Sayed, West Lafayette, IN (US)

(73) Assignees: PURDUE RESEARCH FOUNDATION, West Lafayette, IN (US); DEERE & COMPANY, Moline, IL (US)

( * ) Notice: Subject to any disclaimer, the term of this patent is extended or adjusted under 35 U.S.C. 154(b) by 0 days.

(21) Appl. No.: 15/790,512

(22) Filed: Oct. 23, 2017

(65) Prior Publication Data

US 2018/0145621 A1 May 24, 2018

Related U.S. Application Data

(60) Provisional application No. 62/425,799, filed on Nov. 23, 2016.

(51) Int. Cl.
*H03K 5/00* (2006.01)
*H02P 21/05* (2006.01)
(Continued)

(52) U.S. Cl.
CPC .............. *H02P 21/05* (2013.01); *H02P 21/06* (2013.01); *H02P 21/18* (2016.02); *H02P 21/22* (2016.02); *G01D 5/24476* (2013.01)

(58) Field of Classification Search
CPC .................................. H02P 21/05; H02P 21/18
See application file for complete search history.

(56) References Cited

U.S. PATENT DOCUMENTS

| 7,904,267 B2 | 3/2011 | Wells et al. |
| 2016/0134213 A1 | 5/2016 | Jeong |
| 2017/0284826 A1* | 10/2017 | Wilson ..................... G01D 5/00 |

FOREIGN PATENT DOCUMENTS

EP 2387145 A2 11/2011

OTHER PUBLICATIONS

Jorge, et al., "A Novel Algorithm Based on Polynomial Aprozimations for an Efficient Error Compensation of Magnetic Analog Encoders in PMSMs for EVs," IEEE Transactions on Industrial Electronics, vol. 63, No. 6, pp. 3377-3388, Jun. 1, 2016.

(Continued)

*Primary Examiner* — Karen Masih
(74) *Attorney, Agent, or Firm* — Harness, Dickey & Pierce, P.L.C.

(57) ABSTRACT

In an example embodiment, a method of controlling an electric machine includes obtaining an estimated position waveform, the estimated position waveform being based on a position of a rotor of the electric machine, the estimated position waveform having an error signal and an actual position waveform and determining a corrected position waveform based on the estimated position waveform. The determining the corrected position waveform of the rotor includes determining an estimated first coefficient and an estimated second coefficient and reducing at least one frequency component of the error signal using the estimated first coefficient and the estimated second coefficient to determine the corrected position waveform. The method further includes controlling the electric machine based on the corrected position waveform and reducing a ripple in a direct current (DC) link voltage based on the controlling.

30 Claims, 8 Drawing Sheets

(51) Int. Cl.
H02P 21/18 (2016.01)
H02P 21/22 (2016.01)
H02P 21/06 (2016.01)
G01D 5/244 (2006.01)

(56) References Cited

OTHER PUBLICATIONS

Jorge, et al., "Position error compensation in quadrature analog magnetic encoders through an iterative optimization algorithm," IECON 2014—40th Annual Conference of the IEEE Industrial Electronics Society, pp. 3043-3048, Oct. 29, 2014.
Etended European Search Report dated Mar. 14, 2018.
Wang, X., et al., "Virtual-Impedance-Based Control for Voltage-Source and Current-Source Converters," IEEE Transactions on Power Electronics, vol. 30, No. 12, pp. 7019-7037, Dec. 2015.
Consoli, A., et al., "Common Mode Current Elimination in Multi-Drive Industrial Systems," IEE, pp. 1851-1857, 1999.
Kim, H., et al., "A Virtual Translation Technique to Improve Current Regulator for Salient-Pole AC Machines," 35th Annual IEEE Power Electronics Specialists Conference, pp. 487-493, 2004.
Briz, F., et al., "Dynamic Analysis of Current Regulators for AC Motors Using Complex Vectors," pp. 1253-1260, 1998.
Blasko, V., et al., "A Novel Control to Actively Damp Resonance in Input LC Filter of a Three-Phase Voltage Source Converter," IEEE Transactions on Industry Applications, vol. 33, No. 2, pp. 542-550, Mar./Apr. 1997.

\* cited by examiner

SYSTEMS AND METHODS FOR REDUCING DC-LINK OSCILLATIONS

PRIORITY

This application claims priority to U.S. Provisional Application No. 62/425,799, filed Nov. 23, 2016, the entire contents of which are hereby incorporated by reference.

FIELD

Example embodiments are related to systems and methods for enabling the reduction of DC-link voltage oscillations in a motor system.

BACKGROUND

Position sensors such as encoders, hall sensors and resolvers are used to sense a rotor position of an electric machine such as a permanent magnet (PM) machine. The output signals of a resolver contain absolute position information. The signals, which are modulated using a high-frequency excitation, are processed using specialized resolver-to-digital (R/D) converter circuits. Conventional tracking R/D converters operate under the assumption that ideal resolver signals are supplied to the R/D converter. However, in practice, various manufacturing imperfections in resolvers are always present, such as amplitude imbalance and imperfect quadrature.

SUMMARY

Non-ideal resolver signals induce a periodic error in position measurement. This affects the field orientation control in PM machines, creating oscillations on a dc-link voltage.

The dc-link voltage oscillations are further amplified when a dc-link capacitance is reduced.

The inventors have discovered methods and systems to mitigate dc-link oscillations. The methods include eliminating and/or reducing position error harmonic components and increasing a virtual resistance in a current regulator.

At least one example embodiment provides a method of controlling an electric machine. The method includes obtaining an estimated position waveform, the estimated position waveform being based on a position of a rotor of the electric machine, the estimated position waveform having an error signal and an actual position waveform, determining a corrected position waveform of the rotor based on the estimated position waveform, the determining the corrected position waveform of the rotor includes, determining an estimated first coefficient and an estimated second coefficient, and reducing at least one frequency component of the error signal using the estimated first coefficient and the estimated second coefficient to determine the corrected position waveform. The method further includes controlling the electric machine based on the corrected position waveform and reducing a ripple in a direct current (DC)-link voltage based on the controlling.

BRIEF DESCRIPTION OF THE DRAWINGS

Example embodiments will be more clearly understood from the following detailed description taken in conjunction with the accompanying drawings. FIGS. 1-8 represent non-limiting, example embodiments as described herein.

FIG. 1 is a block diagram of a system for controlling an electrical system, according to an example embodiment;

FIG. 2 illustrates a control block diagram of the system of FIG. 1;

FIG. 3 illustrates an example embodiment of a complex vector current regulator shown in FIG. 2;

FIG. 4 illustrates a waveform of a fundamental component in position error;

FIG. 5 illustrates a block diagram for position error elimination/reduction for two harmonics according to an example embodiment;

FIG. 7 is a block diagram of an electronic data processing system according to an example embodiment; and FIG. 8 illustrates a method of controlling an electric machine according to an example embodiment.

DETAILED DESCRIPTION

Figure 1:
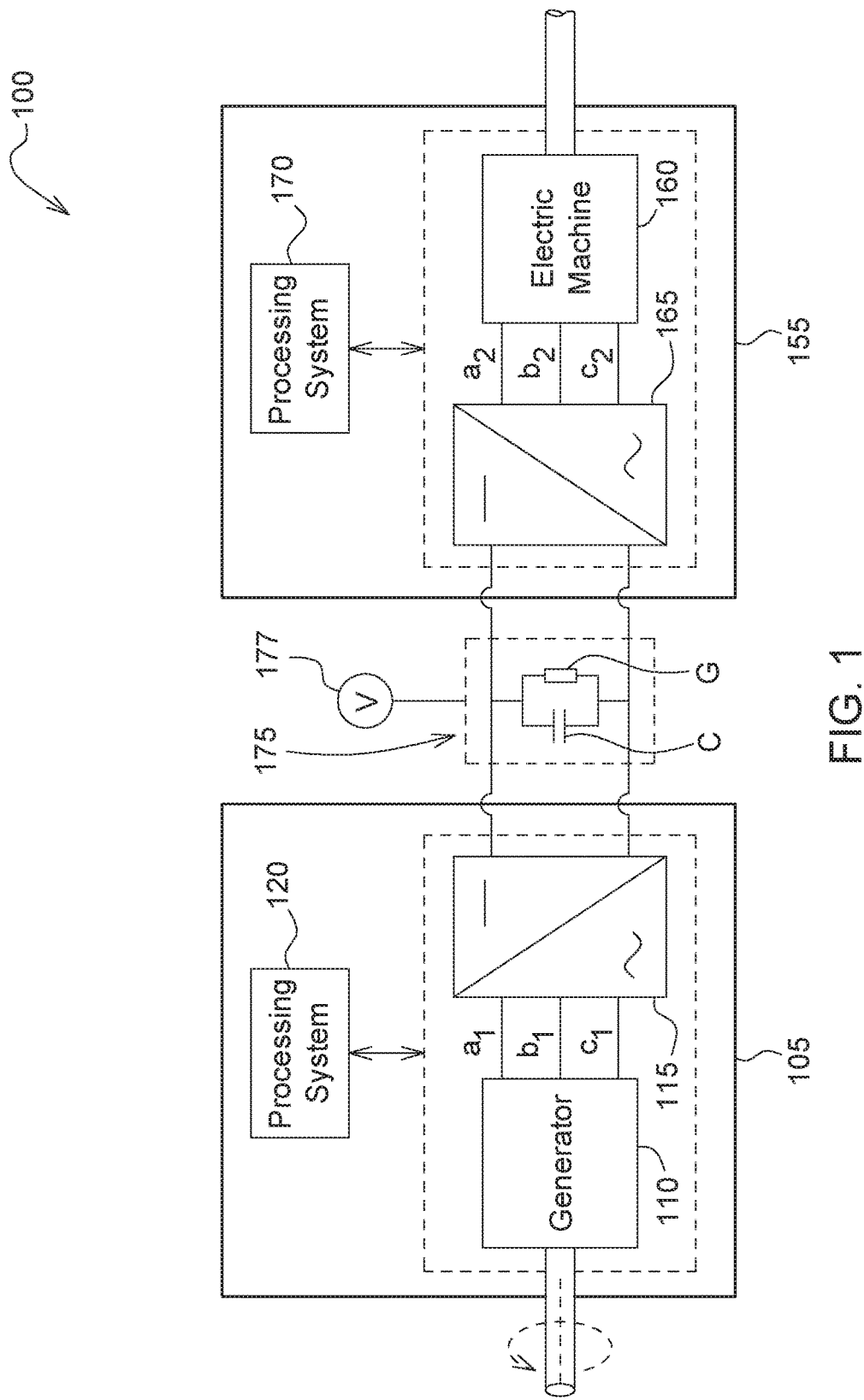

Some example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware. Such existing hardware may include one or more Central Processing Units (CPUs), Digital Signal Processors (DSPs), Application-Specific-Integrated-Circuits (ASICs), Field Programmable Gate Arrays (FPGAs), computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits.

Further, at least one embodiment of the invention relates to a non-transitory computer-readable storage medium comprising electronically readable control information stored thereon, configured such that when the storage medium is used in a controller of a motor system, at least one embodiment of the method is carried out.

Even further, any of the aforementioned methods may be embodied in the form of a program. The program may be stored on a non-transitory computer readable medium and is adapted to perform any one of the aforementioned methods when run on a computer device (a device including a processor). Thus, the non-transitory, tangible computer readable medium is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

Position sensors such as encoders, hall sensors and resolvers are used to sense a rotor position of an electric machine such a permanent magnet machine. The output signals of a resolver contain absolute position information. The signals, which are modulated using a high-frequency excitation, are processed using specialized resolver-to-digital (R/D) converter circuits. Conventional tracking R/D converters operate under the assumption that ideal resolver signals are supplied to the R/D converter. However, in practice, various manufacturing imperfections in resolvers are always present, such as amplitude imbalance and imperfect quadrature. In turn, these lead to non-ideal resolver signals, which induce a periodic error in position measurement. This affects the field orientation control in PM machines, creating oscillations on the dc-link voltage.

The dc-link voltage oscillations are further amplified when the dc-link capacitance is reduced. This could have several negative effects. For example, power quality issues may arise since other components may be powered from the dc-link in a hybrid electric vehicle. In addition, the lifetime of the dc-link capacitor may be decreased, and the operating range of the machines may become limited.

In the description below, the q-d axis current or voltage refers to the direct axis current or voltage and the quadrature axis current or voltage as applicable in the context of vector-controlled alternating current machines. Moreover, while the term command is used below, it should be understood that command refers to a target value.

At least one example embodiment provides a method of controlling an electric machine. The method includes obtaining an estimated position waveform, the estimated position waveform being based on a position of a rotor of the electric machine, the estimated position waveform having an error signal and an actual position waveform, determining a corrected position waveform of the rotor based on the estimated position waveform, the determining the corrected position waveform of the rotor includes, determining an estimated first coefficient and an estimated second coefficient, and reducing at least one frequency component of the error signal using the estimated first coefficient and the estimated second coefficient to determine the corrected position waveform. The method further includes controlling the electric machine based on the corrected position waveform and reducing a ripple in a direct current (DC)-link voltage based on the controlling.

In an example embodiment, the determining the first coefficient and the second coefficient includes obtaining the at least one frequency component of the error signal and determining the estimated first coefficient and the estimated second coefficient based on the obtained at least one frequency component.

In an example embodiment, the reducing the frequency component of the estimated position waveform reduces at least one of a sub-harmonic component and a harmonic component from the error signal of the estimated position waveform using the estimated first coefficient and the estimated second coefficient.

In an example embodiment, the determining the estimated first coefficient and the estimated second coefficient determines the estimated first coefficient and the estimated second coefficient as:

$$\hat{\alpha}_y(s) = \frac{2}{y} f_{LPF}(s) L\{\sin y \hat{\theta}_r\}$$

$$\hat{\beta}_y(s) = -\frac{2}{y} f_{LPF}(s) L\{\cos y \hat{\theta}_r\}$$

where $\hat{\theta}_r$ is a value of the estimated position waveform, $\hat{\alpha}_y(s)$ is the estimated first coefficient for a $y^{th}$ harmonic, $\hat{\beta}_y(s)$ is the estimated second coefficient for the $y^{th}$ harmonic, $f_{LPF}(s)$ is a low-pass filter transfer function and $L\{\}$ is a Laplace transform.

In an example embodiment, a bandwidth of the low-pass filter is at least twenty times smaller than a corresponding frequency component of the at least one frequency component of the error signal.

In an example embodiment, the corresponding frequency component of the error signal is a minimum frequency component of the error signal.

In an example embodiment, the estimated position waveform is based on an output from a position sensor.

In an example embodiment, the position sensor is one of an encoder, a hall sensor and a resolver.

In an example embodiment, the determining the corrected position waveform determines the corrected position waveform using a processing device, the processing device being external to the position sensor.

In an example embodiment, the ripple is at least one of a base frequency of the error signal and twice the base frequency of the error signal.

In an example embodiment, the obtaining the estimated waveform obtains the estimated position, which may contain error components and can be represented as follows:

$$\hat{\theta}_r = \theta_r + \sum_{x \in X} \alpha_x \cos x \theta_r + \beta_x \sin x \theta_r$$

where X is a set of harmonics of the error signal, $\hat{\theta}_r$ is a value of the estimated position waveform, $\theta_r$ is a value of the actual position waveform, ax is the first coefficient and $\beta_x$ is the second coefficient.

In an example embodiment, the controlling the electric machine based on the corrected position waveform includes obtaining direct and quadrature representations of an input voltage command and transforming the direct and quadrature representations of the input voltage command to a three-phase voltage command using the corrected position waveform.

In an example embodiment, the method further includes obtaining direct and quadrature representations of a current command and estimating a speed of the rotor using the corrected position waveform, wherein the obtaining the input voltage command obtains the input voltage command using the estimated speed of the rotor, the direct and quadrature representations of the current command, and direct and quadrature representations of an actual three-phase current, the direct and quadrature representations of the actual three-phase current being based on the corrected position waveform.

In an example embodiment, the controlling the electric machine based on the corrected position waveform includes obtaining a measured three-phase current and transforming the measured three-phase current to direct and quadrature representations of an estimated current using the corrected position waveform.

In an example embodiment, the method further includes obtaining direct and quadrature representations of a current command, estimating a speed of the rotor using the corrected position waveform and generating direct and quadrature representations of a voltage command using the estimated speed of the rotor, the direct and quadrature representations of the current command and direct and quadrature representations of an actual three-phase current, the direct and quadrature representations of the actual three-phase current being based on the corrected position waveform.

In an example embodiment, the reducing the ripple in the dc-link voltage includes increasing a virtual resistance of the electric machine.

In an example embodiment, the method further includes determining a power command based on a virtual conductance, wherein the controlling further controls the electric machine based on the power command.

At least one example embodiment provides a system for controlling an electric machine including a memory storing computer-readable instructions and at least one processing device configured to execute the computer-readable instructions to obtain an estimated position waveform, the estimated position waveform being based on a position of a rotor of the electric machine, the estimated position waveform having an error signal and an actual position waveform, determine a corrected position waveform of the rotor based on the estimated position waveform by determining an estimated first coefficient and an estimated second coefficient and reducing at least one frequency component of the error signal using the estimated first coefficient and the estimated second coefficient to determine the corrected position waveform. The at least one processing device is further configured to execute the computer-readable instructions to control the electric machine based on the corrected position waveform and reduce a ripple in a dc-link voltage based on the controlling.

In an example embodiment, the at least one processing device is configured to execute the computer-readable instructions to obtain the at least one frequency component of the error signal and determine the estimated first coefficient and the estimated second coefficient based on the obtained at least one frequency component.

In an example embodiment, the at least one processing device is configured to execute the computer-readable instructions to reduce at least one of a sub-harmonic component and a harmonic component from the error signal of the estimated position waveform using the estimated first coefficient and the estimated second coefficient.

In an example embodiment, the at least one processing device is configured to execute the computer-readable instructions to determine the estimated first coefficient and the estimated second coefficient as:

$$\hat{\alpha}_y(s) = \frac{2}{y} f_{LPF}(s) L\{\sin y \hat{\theta}_r\}$$

$$\hat{\beta}_y(s) = -\frac{2}{y} f_{LPF}(s) L\{\cos y \hat{\theta}_r\}$$

where $\hat{\theta}_r$ is a value of the estimated position waveform, $\hat{\alpha}_y(s)$ is the estimated first coefficient for a $y^{th}$ harmonic, $\hat{\beta}_y(s)$ is the estimated second coefficient for the $y^{th}$ harmonic, $f_{LPF}(S)$ is a low-pass filter transfer function and $L\{\}$ is a Laplace transform.

In an example embodiment, the at least one processing device is configured to execute the computer-readable instructions to obtain the estimated position, which may contain error components and can be represented as follows:

$$\hat{\theta}_r = \theta_r + \sum_{x \in X} \alpha_x \cos x \theta_r + \beta_x \sin x \theta_r$$

where X is a set of harmonics of the error signal, $\hat{\theta}_r$ is a value of the estimated position waveform, $\hat{\theta}_r$ is a value of the actual position waveform, $\alpha_x$ is the first coefficient and $\beta_x$ is the second coefficient.

In an example embodiment, the at least one processing device is configured to execute the computer-readable instructions to obtain direct and quadrature representations of an input voltage command and transform the direct and quadrature representations of the input voltage command to a three-phase voltage command using the corrected position waveform.

In an example embodiment, the at least one processing device is configured to execute the computer-readable instructions to obtain direct and quadrature representations of a current command, estimate a speed of the rotor using the corrected position waveform and obtain the input voltage command using the estimated speed of the rotor, the direct and quadrature representations of the current command, and direct and quadrature representations of an actual three-phase current, the direct and quadrature representations of the actual three-phase current being based on the corrected position waveform.

In an example embodiment, the at least one processing device is configured to execute the computer-readable instructions to obtain a measured three-phase current and transform the measured three-phase current to direct and quadrature representations of an estimated current using the corrected position waveform.

In an example embodiment, the at least one processing device is configured to execute the computer-readable instructions to obtain direct and quadrature representations of a current command, estimate a speed of the rotor using the corrected position waveform and generate direct and quadrature representations of a voltage command using the estimated speed of the rotor, the direct and quadrature representations of the current command and direct and quadrature representations of an actual three-phase current, the direct and quadrature representations of the actual three-phase current being based on the corrected position waveform.

In an example embodiment, the at least one processing device is configured to execute the computer-readable instructions to increase a virtual resistance of the electric machine.

In an example embodiment, the at least one processing device is configured to execute the computer-readable instructions to obtain a power command based on a virtual conductance and further control the electric machine based on the power command.

FIG. 1 is a block diagram of a system for controlling an electrical system, according to an example embodiment.

As shown in FIG. 1, a system 100 includes a generator drive 105 and a traction drive 155. The generator drive 105 includes a generator 110, a rectifier 115 and a processing system 120. The generator 110 is connected to the rectifier 115. In the example of FIG. 1, the generator 110 is an interior permanent magnet (IPM) machine. However, example embodiments are not limited thereto. The processing system 120 controls the generator 110 and the rectifier 115, as will be described in greater detail with respect to FIG. 2.

The traction drive 155 includes a traction device 160, an inverter 165 and a processing system 170. The traction device 160 is connected to an inverter 165. In the example of FIG. 1, the traction device 160 is an IPM machine. However, example embodiments are not limited thereto. The processing system 170 controls the traction device 160 and the inverter 165, as will be described in greater detail with respect to FIG. 2.

The traction drive 155 is an active load connected to a DC bus 175. It should be understood that the term "DC bus" and "DC link" may be used interchangeably.

The generator drive 105 and traction drive 155 are connected to the same DC bus 175.

The rectifier 115 may be configured as an AC-DC converter to convert three-phase AC power (from windings $a_1$, $b_1$ and $c_1$) from the generator 110 into DC power for the DC bus 175.

The rectifier 115 is controlled by the generator processing system 120, which may include gate drivers and an analog-to-digital converter (ADC), a processing device coupled electrically to the gate drivers, and a memory coupled electrically to the processing device and having stored therein operating instructions for the processing device.

The rectifier 115 includes switching semiconductors (e.g., insulated gate bipolar transistors (IGBT) or other power transistors, including but not limited to, a Metal-Oxide Semiconductor Field-Effect Transistor (MOSFET), a Silicon Carbide MOSFET or a Silicon Carbide IGBT).

Each transistor is coupled electrically to a respective gate driver that is dedicated to that transistor and may provide a low DC voltage (e.g., 24 VDC) to turn on and off that transistor. The gate drivers are under the control of the processing device, which may employ a pulse-width-modulation control scheme to control those gate drivers to supply electric energy on the DC bus 175 in a generating mode of the generator 110. In example embodiments, space vector modulation may be used. However, it should be understood, that any known pulse-width-modulation scheme for drive systems may be used. Thus, for the sake of brevity, the pulse-width-modulation scheme will not be described in greater detail.

The traction device 160 may have three phase windings $a_2$, $b_2$ and $c_2$. The inverter 165 is coupled electrically between the traction device 160 and the DC bus 175. The inverter 165 may be configured, for example, as a DC-AC inverter to convert DC power from the DC bus 175 into three-phase AC power for the traction device 160, and vice versa.

As used in this document, switch states indicate whether a properly functioning or unimpaired semiconductor device is active ("on" or "closed") or inactive ("off" or "open"). A failure of a semiconductor device to change states may result in a semiconductor device failing in an open state or a closed state, for example.

The inverter 165 is controlled by the motor processing system 170. The motor processing system 170 may include gate drivers and an analog-to-digital converter (ADC), a processing device coupled electrically to the gate drivers, and a memory coupled electrically to the processing device and having stored therein operating instructions for the processing device.

The processing system 170 may include gate drivers and an analog-to-digital converter (ADC), a processing device coupled electrically to the gate drivers, a memory coupled electrically to the processing device and having stored therein operating instructions for the processing device.

The inverter 165 includes switching semiconductors (e.g., insulated gate bipolar transistors (IGBT) or other power transistors, including but not limited to, a Metal-Oxide Semiconductor Field-Effect Transistor (MOSFET), a Silicon Carbide MOSFET or a Silicon Carbide IGBT).

The transistors of the inverter are coupled electrically to a respective gate driver that is dedicated to that transistor and may provide a low DC voltage (e.g., 24 VDC) to turn on and off that transistor. The gate drivers are under the control of the processing device, which may employ a pulse-width-modulation control scheme to control those gate drivers to supply electric energy on the DC bus 175 in the generating mode of the traction device 160 and remove electric energy from the DC bus 175 in the motoring mode of the traction device 160.

The DC bus 175 may be configured, for example, as a bank of capacitors, but is not limited thereto. In FIG. 1, the DC bus 175 is modeled as an ideal capacitor C with an admittance G in parallel with the capacitor C.

In a back to back dual inverter system such as the system shown in FIG. 1, the DC bus capacitor C has at least two functions. In a steady state, the DC bus capacitor provides a low impedance path for a high frequency ripple current to flow.

In the description below, variables with a hat, e.g., x̂, denote estimated (e.g., directly measured) values. Variables with an asterisk, e.g., x*, denote commanded values. Variables with a double hat, e.g., x̂̂, denote a corrected value of the estimated values. For example, in the description below, $\hat{\theta}_r$ is an estimated position waveform that is measured by a sensor (e.g., a resolver) and $\hat{\hat{\theta}}_r$ is a corrected value of the estimated position waveform measured by the sensor.

Figure 2:
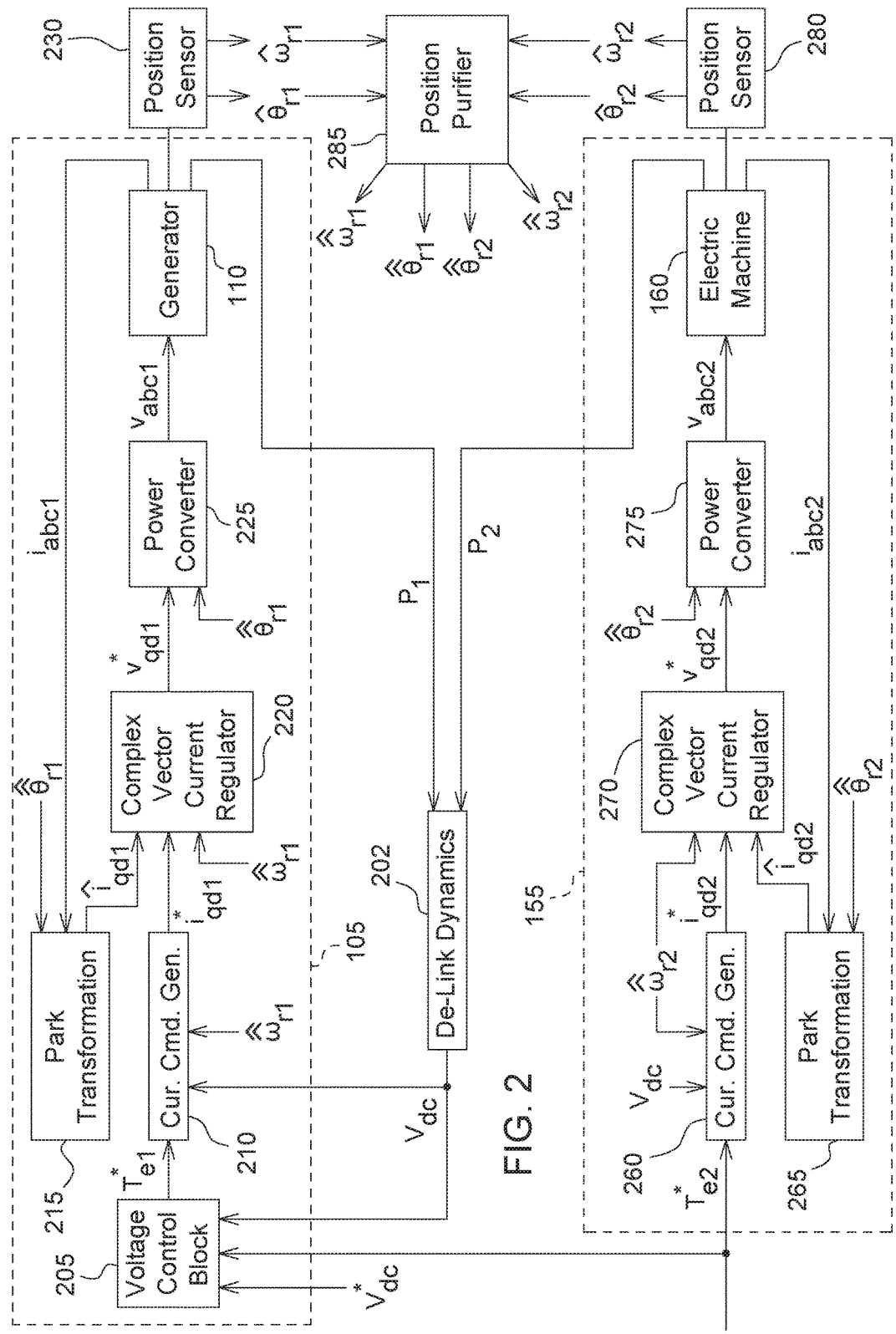

FIG. 2 illustrates a control block diagram of the system of FIG. 1. In FIG. 2, the dc-link is represented by $P_1$, $P_2$ and dc-link dynamics 202. A voltage sensor 177 (shown in FIG. 1) measures the DC bus voltage and provides the measured DC bus voltage $v_{dc}$ to the voltage controller 205. The measured DC bus voltage $v_{dc}$ is shown in FIG. 2 without a hat (i.e., $v_{dc}$) because the measured quantity is assumed to be equal to the actual physical quantity. The voltage sensor 177 contributes to the DC-link dynamics 202, shown in FIG. 2, which measures the voltage $v_{dc}$ across the DC bus 175.

As shown in FIG. 2, the generator drive 105 includes a voltage controller 205, a current command generator 210, a Park transformation module 215, a complex vector current regulator 220 and a power converter 225. The voltage controller 205, the current command generator 210, the Park transformation module 215, the complex vector current regulator 220 and the power converter 225 may be part of the processing system 120 and may be hardware and/or stored in memory to be executed by a processing device.

The voltage controller 205 receives a DC bus voltage command $v_{dc}^*$ and the measured DC bus voltage $v_{dc}$. The voltage controller 205 performs proportional-integral (PI) control of the DC bus voltage $v_{dc}$, or more precisely, of the capacitor energy. In one example embodiment, the voltage controller 205 outputs a torque command $T_{e1}^*$.

In an example embodiment, the voltage controller 205 generates the torque command $T_{e1}^*$ as follows:

$$e_v = 1 - \left(\frac{v_{dc}}{v_{dc0}}\right)^2 \tag{1}$$

$$\frac{d}{dt}z_v = K_{iv}e_v \tag{2}$$

-continued $$T_{e1}^* = -K_{pv}e_v - z_v - K_{ffv}\left(\frac{T_{e2}^*\hat{\omega}_{r2}*pp_1}{\hat{\omega}_{r1}*pp_2}\right) \quad (3)$$

where $v_{dc0}$ is a DC bus equilibrium voltage, $\hat{\omega}_{r1}$ is a corrected electrical rotor speed of the generator 110, $\hat{\omega}_{r2}$ is a corrected electrical rotor speed of the traction device 160, $z_v$ is an integral output of a PI controller in the voltage controller 205, $pp_1$ is the number of pole pairs in the generator 110 and $pp_2$ is the number of pole pairs in the traction device 160, $T_{e2}^*$ is a torque command for the traction device 160, $K_{pv}$>0 and $K_{iv}$>0 are PI gains, and $K_{ffv}$>0 is a feed-forward gain (its value is based on empirical data, but may be slightly greater than or less than 1.0 based on whether a machine is running in motoring mode or generating mode).

While electrical speeds are used in some of the equations, it should be understood that such equations may be reformulated to use mechanical speeds. In example embodiments described below, the pole pairs of the traction device 160 and the generator 110 are the same and, thus, are not reflected in the equations described below.

In another example embodiment where the voltage controller 205 generates a power command $P_1^*$, the voltage controller 205 obtains PI gains $K_{pv}$ and $K_{iv}$ as follows:

$$K_{pv} = \omega_{bv}\frac{C}{2} \quad (4)$$

$$K_{iv} = \omega_{bv}(G + G_a) \quad (5)$$

where $\theta_{bv}$ is a bandwidth of the voltage controller 205 and $G_a$ is a virtual conductance used for active feedback. The virtual conductance $G_a$ may be approximately 5-10 times the real part of the admittance G, which may be represented as a complex number with real and imaginary parts.

The voltage controller 205 then generates the power command $P_1^*$ as follows:

$$e_v = v_{dc0}^2 - v_{dc}^2 \quad (6)$$

$$\frac{d}{dt}z_v = K_{iv}e_v \quad (7)$$

$$P_1^* = -z_v - K_{pv}e_v - K_{ffv}T_{e2}^*\hat{\omega}_{rm2} + G_a v_{dc}^2 \quad (8)$$

where $\hat{\omega}_{rm2}$ is a corrected mechanical rotor speed of the traction device 160, where $$\hat{\omega}_{rm2}=\hat{\omega}_{r2}/pp_2 \quad (9)$$

where $\hat{\omega}_{r2}$ is a corrected electrical rotor speed (in rad/s) of the traction device 160 and $pp_2$ is the number of pole pairs in the traction device 160.

The voltage controller 205 may then obtain the torque command $T_{e1}^*$ from the power command $P_1^*$ using the following equation:

$$T_{e1}^* = \frac{P_1^*}{\hat{\omega}_{rm1}} = pp_1\frac{P_1^*}{\hat{\omega}_{r1}} \quad (10)$$

where $\hat{\omega}_{rm1}$ is a corrected mechanical rotor speed of the generator 110 and $\hat{\omega}_{r1}$ is a corrected electric rotor speed of the generator 110.

Figure 7:
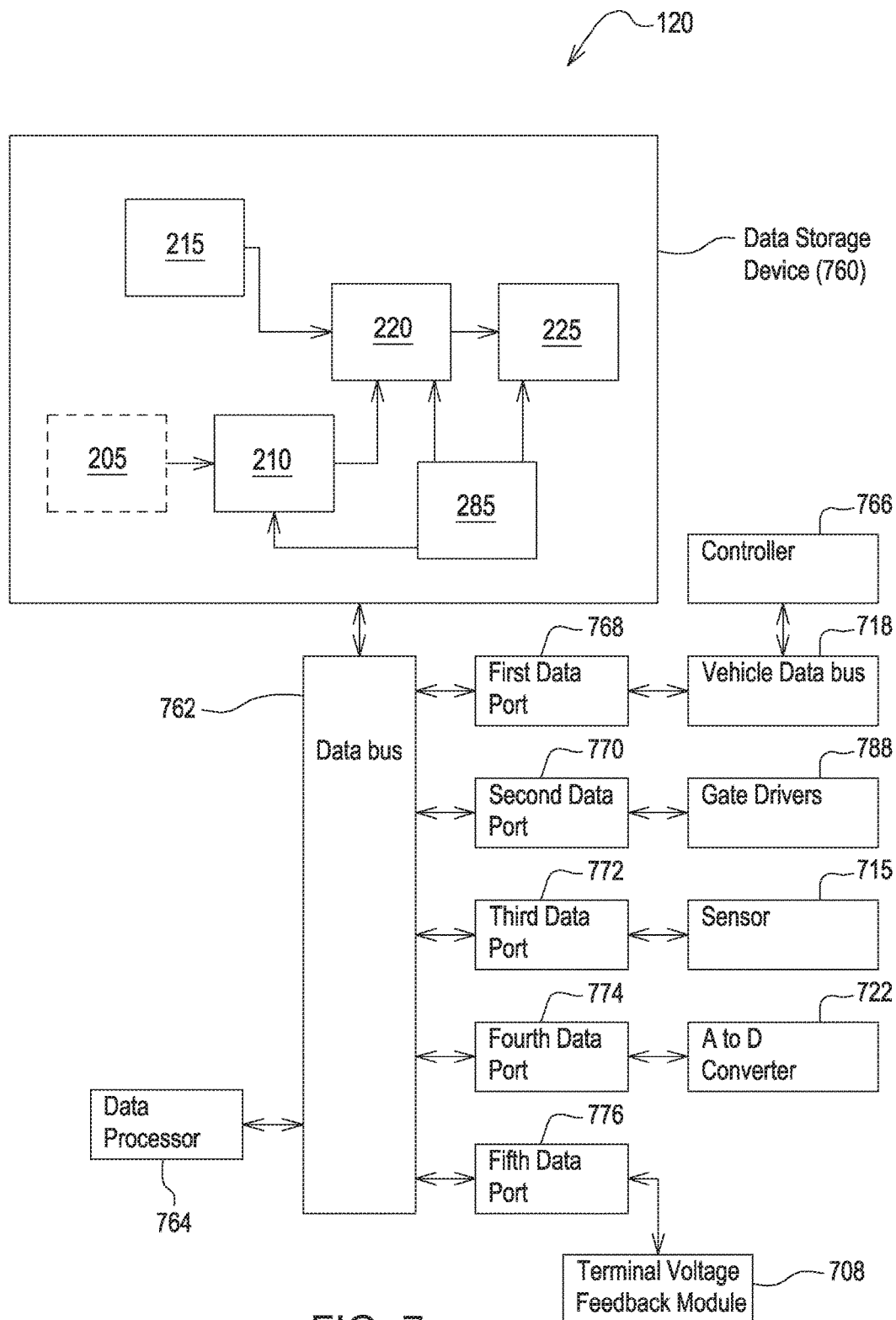

The current command generator 210 may be implemented as a look-up table in hardware and/or stored in memory (e.g., storage 760 of FIG. 7). Using the torque command $T_{e1}^*$, the dc bus voltage $v_{dc}$ and the corrected electric rotor speed $\hat{\omega}_{r1}$ of the generator 110, the current command generator 210 generates q-d axis current commands $i_{q1}^*$ and $i_{d1}^*$ using MTPA (maximum torque per amp) and/or MTPV (maximum torque per volt) curves.

It should be understood that the notation of "qd" and "dq" in the subscript refers to both the direct and quadrature currents. In other words, $i_{qd}$ (or $i_{dq}$) represents a vector of $i_q$ and $i_d$. Similar notation is used for "abc", which represents three phases.

During motor characterization, multiple current commands are used at different speed points, which generates the MTPA (maximum torque per amp) and MTPV (maximum torque per volt) curves. Generally, motor characterization is a procedure used to determine d-axis and q-axis commands for a specific speed and $v_{dc}$ condition and torque command. The procedure is repeated at multiple torque commands and multiple speeds. Any known motor characterization procedure may be used.

Referring back to FIG. 2, the Park transformation module 215 (i.e., three-phase to two-phase current Park transformation module) converts respective three-phase digital representations of measured current into corresponding two-phase digital representations of measured current by performing a Park transformation. More specifically, the Park transformation module 215 transforms a measured three-phase current $i_{abc1}$ to a q-d axis estimated current $\hat{i}_{qd1}$ using a corrected rotor position $\hat{\theta}_{r1}$ of the generator 110.

Consequently, the q-d estimated current $\hat{i}_{qd1}$ is affected by the corrected rotor position $\hat{\omega}_{r1}$ of the generator 110.

A position sensor 230 generates an estimated/measured rotor position $\hat{\theta}_{r1}$ from an output of the generator 110. As shown in FIG. 2, the position sensor 230 may be external to the processing system (i.e., the voltage controller 205, the current command generator 210, the Park transformation module 215, the complex vector current regulator 220 and the power converter 225).

More specifically, the sensor 230 (e.g., a resolver, encoder, speed sensor, or another position sensor or speed sensors) may determine the estimated/measured rotor position $\hat{\theta}_{r1}$, the estimated speed of the rotor $\hat{\omega}_{r1}$, and a direction of rotation of the rotor of the generator 110. The sensor 230 may be mounted on or integral with the rotor of the generator 110. In an example embodiment, the sensor 230 may be coupled to an analog-to-digital converter (not shown) that converts analog raw position data or velocity data to digital raw position or velocity data, respectively. In other example embodiments, the sensor 230 (e.g., digital position encoder) may provide a digital data output of raw position data or velocity data for a shaft or rotor of the generator 110.

The estimated/measured rotor position $\hat{\theta}_{r1}$ and the estimated speed of the rotor $\hat{\omega}_{r1}$ of the sensor 230 are communicated to a position purifier 285. The position purifier 285 converts the estimated rotor position $\hat{\theta}_{r1}$ and an estimated rotor position $\hat{\theta}_{r2}$ of the traction device 160 into corrected rotor positions $\hat{\theta}_{r1}$ and $\hat{\theta}_{r2}$, respectively, as described in further detail below. Moreover, the position purifier 285 converts the estimated speed of the rotor $\hat{\omega}_{r1}$ and an estimated speed $\hat{\theta}_{r2}$ of the traction device 160 into corrected rotor speeds $\hat{\hat{\omega}}_{r1}$ and $\hat{\hat{\omega}}_{r2}$, respectively, using the corrected rotor positions $\hat{\hat{\theta}}_{r1}$ and $\hat{\hat{\theta}}_{r2}$, respectively, by using a moving average of a change in corrected rotor position divided by a change in time. In another example embodiment, the position purifier 285 uses a Luenberger observer which uses the corrected rotor position to determine the associated corrected rotor speed as a state estimate.

The position purifier 285 may be considered as part of the processing systems 120 and 170.

Figure 3:
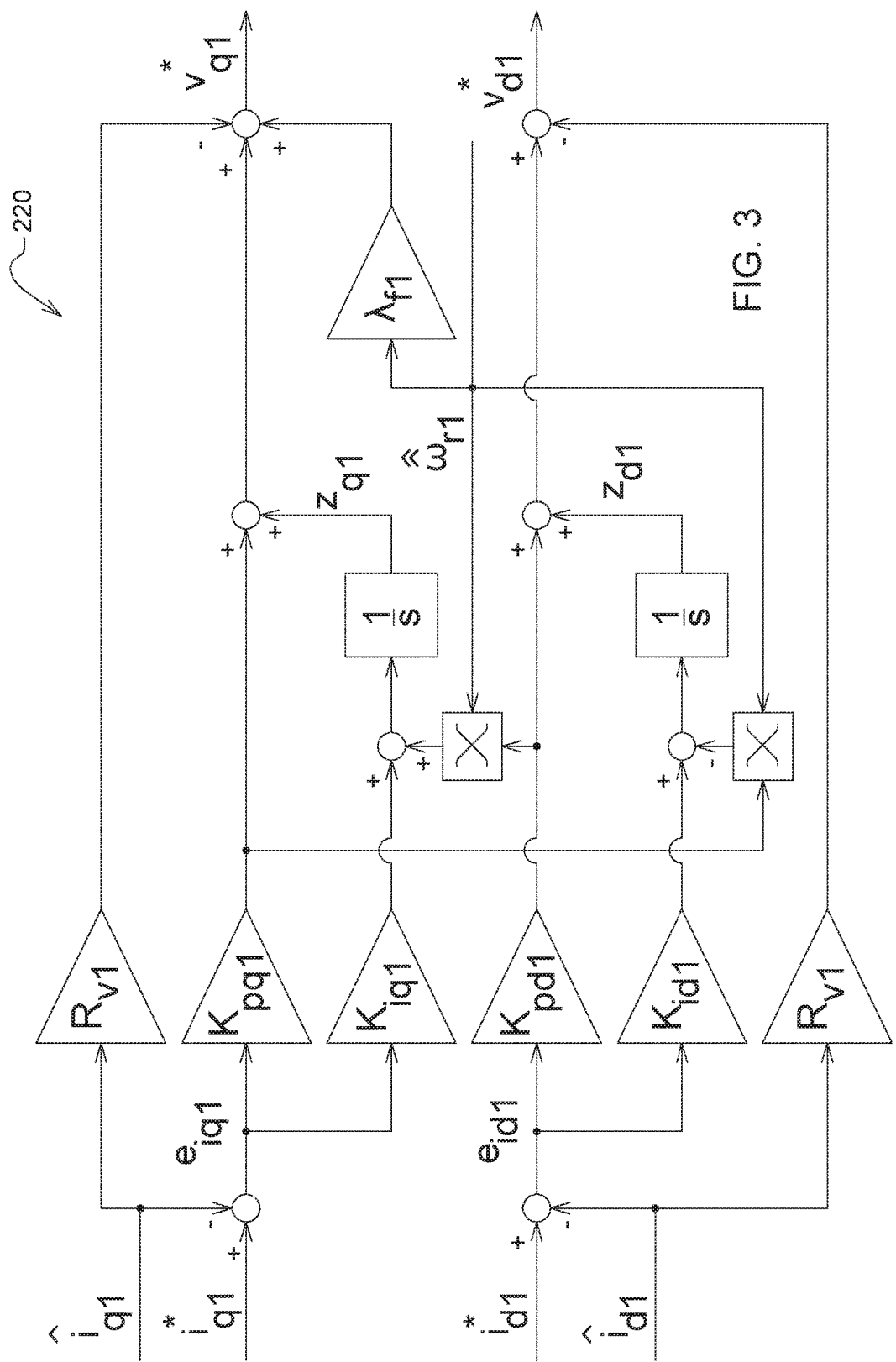

FIG. 3 illustrates an example embodiment of the complex vector current regulator 220.

As shown in FIG. 3, the complex vector current regulator 220 receives the q-d axis estimated current $\hat{i}_{qd1}$, the q-d axis current commands $i_{qd1}^*$ and the corrected speed of the rotor $\hat{\hat{\omega}}_{r1}$. The complex vector current regulator 220 generates a q-d axis voltage command $v_{qd1}^*$ based on the q-d axis estimated current $\hat{i}_{qd1}$, the q-d axis current commands $i_{qd1}^*$ and the corrected speed of the rotor $\hat{\hat{\omega}}_{r1}$.

More specifically, the complex vector current regulator 220 generates the q-d axis voltage command $v_{qd1}^*$ using the following:

$$\frac{d}{dt} z_{q1} = K_{iq1} e_{iq1} + K_{pd1} \hat{\hat{\omega}}_{r1} e_{id1} \quad (11)$$

$$\frac{d}{dt} z_{d1} = K_{pq1} \hat{\hat{\omega}}_{r1} e_{iq1} + K_{id1} e_{id1} \quad (12)$$

$$v_{q1}^* = K_{pq1} e_{iq1} + z_{q1} - R_{v1} \hat{i}_{q1} + \lambda_{f1} \hat{\hat{\omega}}_{r1} \quad (13)$$

$$v_{d1}^* = K_{pd1} e_{id1} + z_{d1} - R_{v1} \hat{i}_{d1} \quad (14)$$

$$K_{pd1} = \omega_{bi1} L_{dd1} \quad (15)$$

$$K_{id1} = \omega_{bi1} (r_{s1} + R_{v1}) \quad (16)$$

$$K_{pq1} = \omega_{bi1} L_{qq1} \quad (17)$$

$$K_{iq1} = \omega_{bi1} (r_{s1} + R_{v1}) \quad (18)$$

$$L_{qq1} = \frac{\partial \bar{f}_q}{\partial i_q} \quad (19)$$

$$L_{dd1} = \frac{\partial \bar{f}_d}{\partial i_d} \quad (20)$$

where $z_{q1}$ and $z_{d1}$ are outputs of q- and d-axis integrators that are obtained from equations (11) and (12), respectively, $K_{iq1}$, $K_{pq1}$, $K_{id1}$ and $K_{pd1}$ are PI gains, $\lambda_{f1}$ is a constant that approximates the flux linkage created in the rotor flux (rf)-axis (also referred to as d-axis) by the permanent magnets, $r_{s1}$ is a stator resistance of the generator 110, $R_{v1}$ is a 'virtual resistance', which may be 5-10 times the stator resistance $r_{s1}$ of the generator 110, $\omega_{bi1}$ is a bandwidth of a current regulator (e.g., a complex vector current regulator 220), $L_{dd1}$ and $L_{qq1}$ are incremental inductances, $\bar{f}_d$ and $\bar{f}_d$ are average d- and q-axes flux linkages, respectively, and $e_{iq1}$ and $e_{id1}$ are error signals determined as follows:

$$e_{iq1} = i_{q1}^* - \hat{i}_{q1} \quad (21)$$

$$e_{id1} = i_{d1}^* - \hat{i}_{d1} \quad (22)$$

It should be understood that the equations above apply also to the traction drive 155, with the gains and parameters specific to the traction drive (e.g., PI gains, constant that approximates the flux linkage, stator resistor of the traction device 160, bandwidth of a current regulator (e.g., a current regulator 270) and incremental inductances).

The power converter 225 converts respective two-phase q-d axis representations of a voltage command into corresponding three phase voltages applied to the generator 110. More specifically, the power converter 225 transforms the q-d axis voltage command $v_{qd1}^*$ into actual three phase voltages $v_{abc1}$ using the corrected rotor position $\hat{\hat{\theta}}_{r1}$ of the generator 110 as follows:

$$v_{a1} = v_{q1}^* \cos \hat{\hat{\theta}}_{r1} + v_{d1}^* \sin \hat{\hat{\theta}}_{r1} \quad (23)$$

$$v_{b1} = v_{q1}^* \cos(\hat{\hat{\theta}}_{r1} - 2\pi/3) + v_{d1}^* \sin(\hat{\hat{\theta}}_{r1} - 2\pi/3) \quad (24)$$

$$v_{c1} = v_{q1}^* \cos(\hat{\hat{\theta}}_{r1} + 2\pi/3) + v_{d1}^* \sin(\hat{\hat{\theta}}_{r1} + 2\pi/3) \quad (25)$$

Consequently, the three phase voltage $v_{abc1}$ is affected by the corrected rotor position $\hat{\hat{\theta}}_{r1}$ of the generator 110. In the example embodiment of equations (23)-(25), the inverter is ideal, i.e., it generates an actual voltage that equals the command. Switching harmonics are also present.

Similar to the generator drive 105, the traction drive 155 includes a current command generator 260, a Park transformation module 265, a complex vector current regulator 270 and a power converter 275. The current command generator 260, the Park transformation module 265, the complex vector current regulator 270 and the power converter 275 may be part of the processing system 170 and are hardware and/or stored in memory.

A sensor 280 operates in the same manner as the sensor 230 to obtain the estimated rotor position $\theta_{r2}$ and estimated rotor speed $\hat{\omega}_{r2}$ of the traction device 160.

The position purifier 285 converts the estimated rotor position $\hat{\theta}_{r2}$ into the corrected rotor position $\hat{\hat{\theta}}_{r2}$, as described in further detail below. Moreover, the position purifier 285 converts the estimated speed of the rotor $\hat{\omega}_{r2}$ into the corrected speed $\hat{\hat{\omega}}_{r2}$ using the corrected rotor position $\hat{\hat{\theta}}_{r2}$.

The current command generator 260, the Park transformation module 265, the complex vector current regulator 270 and the power converter 275 perform the same functions as the current command generator 210, the Park transformation module 215, the complex vector current regulator 220 and the power converter 225, respectively. Thus, the same functions apply to the current command generator 260, the Park transformation module 265, the complex vector current regulator 270 and the power converter 275 except measurements, machine parameters and estimates with respect to the traction drive 155 are used (i.e., using the corrected rotor position $\hat{\hat{\theta}}_{r2}$ instead of the corrected rotor position $\hat{\hat{\theta}}_{r1}$).

Position error commonly occurs at the first and second harmonics of the base frequency due to imperfections in resolver manufacturing. Moreover, the error signal may contain other harmonics of a base frequency and a subharmonic signal (i.e., a non-integer relationship with base frequency). The position error has an effect on the dc-link voltage $v_{dc}$ at these particular frequencies over the entire operating range.

Fundamental frequency refers to an electrical fundamental frequency of a main machine (e.g., the generator 110). When the generator 110 is the main machine, the fundamental frequency is defined as $rpm/60*pp_1$, where $pp_1$ is the main machine pole pair number and rpm is the revolutions per minute of the main machine. When the traction device 160 is the main machine, the fundamental frequency is defined as rpm/60*$pp_2$, where $pp_2$ is the main machine pole pair number and rpm is the revolutions per minute of the main machine.

The base frequency is defined as the fundamental frequency of the resolver associated with the main machine (e.g., the sensor 230), which is based on the number of lobes of the resolver. It depends on the sensor type and configuration. Based on the number of lobes, the base frequency can be equal to fundamental frequency of the main machine or smaller than fundamental frequency.

In the discussion below, subscripts that identify a corresponding machine (e.g., the generator drive 105 or the traction drive 155) are mostly omitted because the functions below apply to both machines.

Fundamental Position Error

When the base frequency is the fundamental frequency, a dominant component of the error is at the base frequency and an estimated position signal $\hat{\theta}_r$ generated by a sensor (e.g., sensors 230 and 280) may be represented as follows:

$$\hat{\theta}_r = \theta_r + \underbrace{\alpha\cos\theta_r + \beta\sin\theta_r}_{\varepsilon} \quad (26)$$

where $\varepsilon$ is a position measurement error from the resolver (error signal), and $\alpha$ and $\beta$ are coefficients. Thus, the measured position signal $\hat{\theta}_r$ includes the error signal part $\varepsilon$ and an actual position waveform $\theta_r$.

The use of $\hat{\theta}_r$ is used herein because the description thereof applies to both estimated rotor positions $\hat{\theta}_{r1}$ and $\hat{\theta}_{r2}$.

Figure 4:
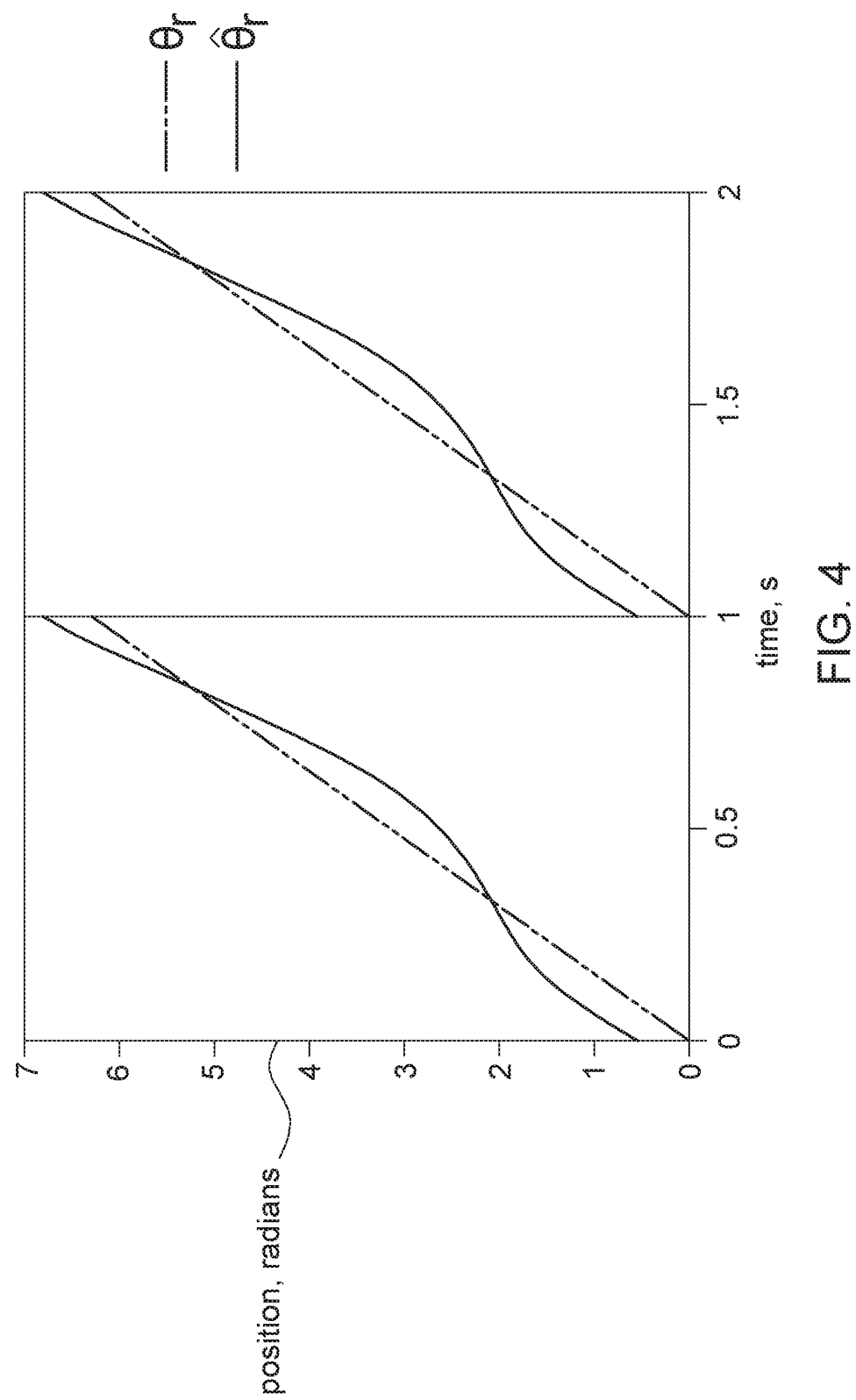

For example, FIG. 4 illustrates a fundamental component in position error. In FIG. 4, $\theta_r$ is $2\pi t$, corresponding to a constant rotor speed of $2\pi$ rad/s, where $\alpha$ is 0.52 rad and $\beta$ is 0.3 rad. As shown in FIG. 4, the estimated position signal $\hat{\theta}_r$ often differs from the actual position signal $\theta r$ due to the fundamental component in position error.

One of the potential ways to reduce the oscillations is to eliminate the position error at the source itself. Thus, in at least some example embodiments, a processing system (e.g., 120 or 170) reduces and/or eliminates a fundamental position error for the corresponding machine (e.g., the generator 110 or the traction device 160) by first estimating the coefficients $\alpha$ and $\beta$, estimating the position error E and subtracting the estimated position error $\hat{\varepsilon}$ from the measured position signal in order to obtain a correct position signal.

To estimate the coefficients $\alpha$ and $\beta$, the processing system 120/170 determines:

$$\cos\hat{\theta}_r = \cos(\theta_r + \varepsilon) = \cos\theta_r \cos\varepsilon - \sin\theta_r \sin\varepsilon \quad (27)$$

As the error $\varepsilon$ is very small, the following approximations are valid: $\cos\varepsilon \approx 1$ and $\sin\varepsilon \approx \varepsilon$. The above equation reduces to:

$$\cos\hat{\theta}_r \approx \cos\theta_r - \varepsilon\sin\theta_r \quad (28)$$

Substituting $\varepsilon$ from (26) into (28) results in:

$$\cos\hat{\theta}_r \approx \cos\theta_r - (\alpha\cos\theta_r + \beta\sin\theta_r)\sin\theta_r \quad (29)$$

Using trigonometric identities:

$$\cos\hat{\theta}_r \approx \cos\theta_r - \frac{\alpha}{2}\sin2\theta_r - \frac{\beta}{2}(1 - \cos2\theta_r) \quad (30)$$

Similarly, computing $\sin\hat{\theta}_r$ with the above approximations yields:

$$\sin\hat{\theta}_r = \sin\theta_r\cos\varepsilon + \cos\theta_r\sin\varepsilon \approx \sin\theta_r + \varepsilon\cos\theta_r \quad (31)$$

$$\sin\hat{\theta}_r \approx \sin\theta_r + (\alpha\cos\theta_r + \beta\sin\theta_r)\cos\theta_r \quad (32)$$

$$\sin\hat{\theta}_r \approx \sin\theta_r + \frac{\alpha}{2}(1 + \cos2\theta_r) + \frac{\beta}{2}\sin2\theta_r \quad (33)$$

The coefficients $\alpha$ and $\beta$ are estimated by the processing system by low-pass filtering the signals from equations (33) and (30), respectively, to eliminate oscillatory zero-mean components. In the frequency domain, the coefficients $\alpha$ and $\beta$ may be estimated as follows:

$$\hat{\alpha}(s) = 2f_{LPF}(s)L\{\sin\hat{\theta}_r\} \quad (34)$$

$$\hat{\beta}(s) = -2f_{LPF}(S)L\{\cos\hat{\theta}_r\} \quad (35)$$

where $\hat{\alpha}$, $\hat{\beta}$ are the estimated coefficients, $f_{LPF}(S)$ represents a low-pass filter transfer function, and $L\{f(t)\}$ is the Laplace transform of a time-domain quantity.

For example, the transfer function of a first-order low-pass filter with time constant $\tau$ is: $f_{LPF}(S) = 1/(\tau s + 1)$.

The second harmonic components in $\hat{\alpha}$ and $\hat{\beta}$ can be neglected compared to the fundamental component. This is because the signals at this frequency are attenuated more than the fundamental.

Thus, the error $\varepsilon$ may be estimated by the processing system:

$$\hat{\varepsilon} = \hat{\alpha}\cos\hat{\theta}_r + \hat{\beta}\sin\hat{\theta}_r \quad (36)$$

The estimated position signal is then corrected by the position purifier 285 by subtracting the estimated error from the measured position:

$$\hat{\hat{\theta}}_r = \hat{\theta}_r - \hat{\varepsilon} \quad (37)$$

The corrected position $\hat{\hat{\theta}}_r$ ($\hat{\hat{\theta}}_{r1}$ for the generator drive 105 and $\hat{\hat{\theta}}_{r2}$ for the traction drive 155) is then used in the control diagram shown in FIG. 2 for Park and inverse Park transformations.

Harmonic Components

The above discussion regarding reducing/eliminating a fundamental component in position error can be extended to any desired harmonic or subharmonic component in the position error.

Figure 5:
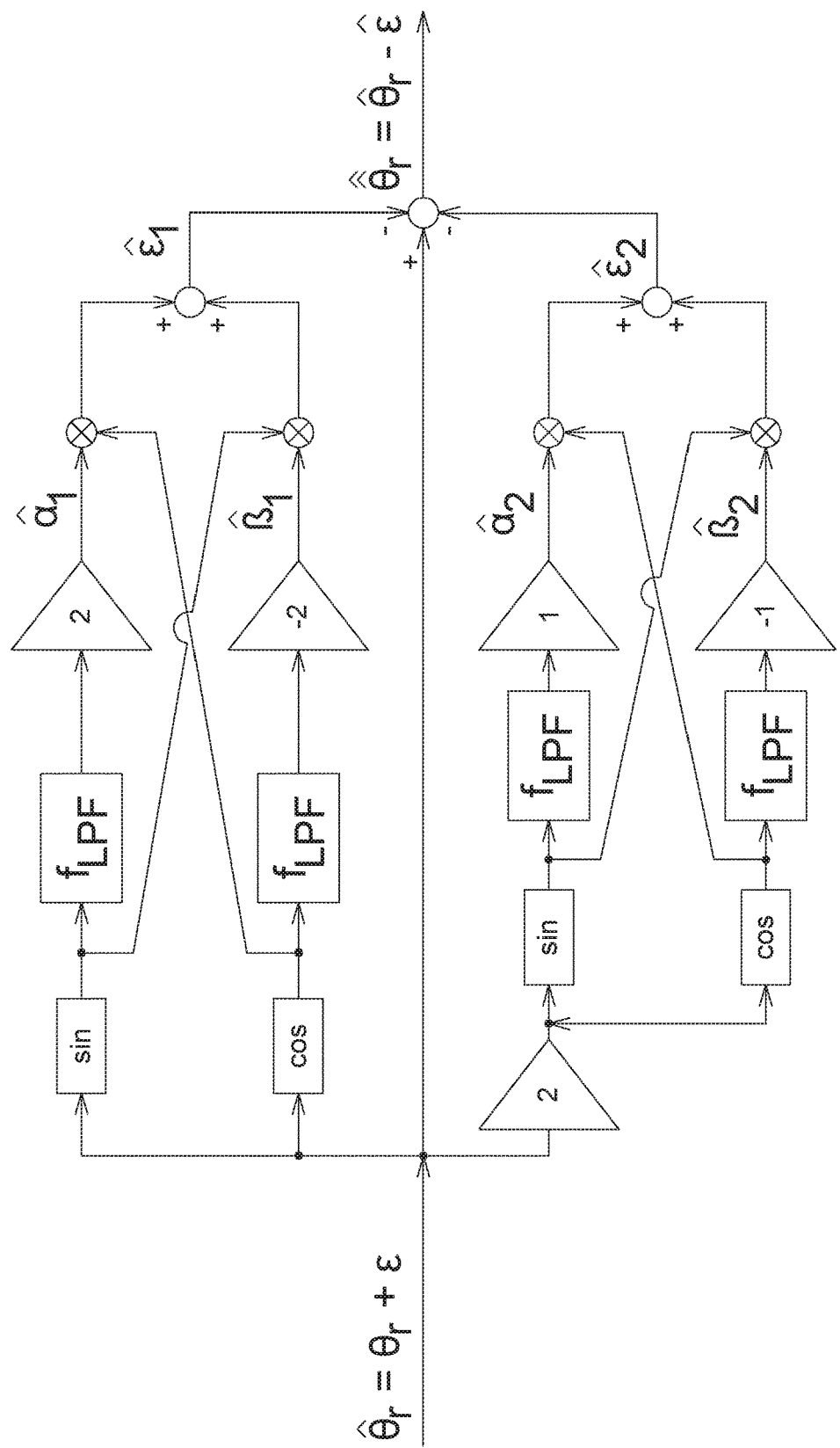

FIG. 5 illustrates a block diagram for position error elimination/reduction for two harmonics according to an example embodiment. The block diagram may be implemented by the processing system 120/170. As shown in FIG. 5, an error signal $\hat{\varepsilon}_y$ is determined for each $y^{th}$ harmonic.

More specifically, the measured position signal may be expressed as:

$$\hat{\theta}_r = \theta_r + \underbrace{\sum_{x \in X}\alpha_x\cos x\theta_r + \beta_x\sin x\theta_r}_{\varepsilon} \quad (38)$$

where x is a harmonic number of a base frequency of error component and X is a set of harmonics. Note the set of harmonics may include subharmonics as well as integer harmonics.

To eliminate a $y^{th}$ harmonic component from the measured position signal $\hat{\theta}_r$, the processing system 120/170 determines $\cos y\hat{\theta}_r$ and $\sin y\hat{\theta}_r$.

The coefficients $\hat{\alpha}_y$ and $\hat{\beta}_y$ of the $y^{th}$ harmonic error in position can be estimated by low-pass filtering cos $y\hat{\theta}_r$ and sin $y\hat{\theta}_r$ based on the approximations cos $y\varepsilon \approx 1$ and sin $y\varepsilon \approx y\varepsilon$:

$$\hat{\alpha}_y(s) = \frac{2}{y} f_{LPF}(s) L\{\sin y\hat{\theta}_r\} \quad (39)$$

$$\hat{\beta}_y(s) = -\frac{2}{y} f_{LPF}(s) L\{\cos y\hat{\theta}_r\} \quad (40)$$

The position error due to the $y^{th}$ harmonic is then estimated by $$\hat{\varepsilon}_y \approx \hat{\alpha}_y \cos y\hat{\theta}_r + \hat{\beta}_y \sin y\hat{\theta}_r \quad (41)$$

which is subsequently subtracted from the position signal $\hat{\theta}_r$, as shown in equation (37), for each harmonic.

The total position error can then be estimated by the processing system as:

$$\hat{\varepsilon} = \sum_{y \in Y} \hat{\varepsilon}_y \quad (42)$$

where the set $Y \subset X$ contains the harmonics and/or subharmonics that are targeted.

As discussed above, the reduction/elimination of a fundamental component and any harmonic or subharmonic uses a low-pass filter. The low-pass filter bandwidth may be at least 20 times smaller than a minimum frequency of all components of interest in the position error that are to be removed/reduced.

Current Regulator

Altering the virtual resistance $R_{v1}$ of the complex vector current regulator 220 (as well as the virtual resistance $R_{v2}$ of the complex vector current regulator 270) affects the impact that position error has on dc-link voltage oscillations. Increasing the virtual resistance $R_{v1}$ increases the integral gains $K_{iqd1}$ as well as reduces the dc-link voltage oscillations in the frequency range around the fundamental frequency if the integral gains $K_{iqd1}$ are determined using equations (16) and (18). Increasing the virtual resistance $R_{v2}$ has the same impact on integral gains $K_{iqd2}$ for the traction drive 155.

Figure 6A:
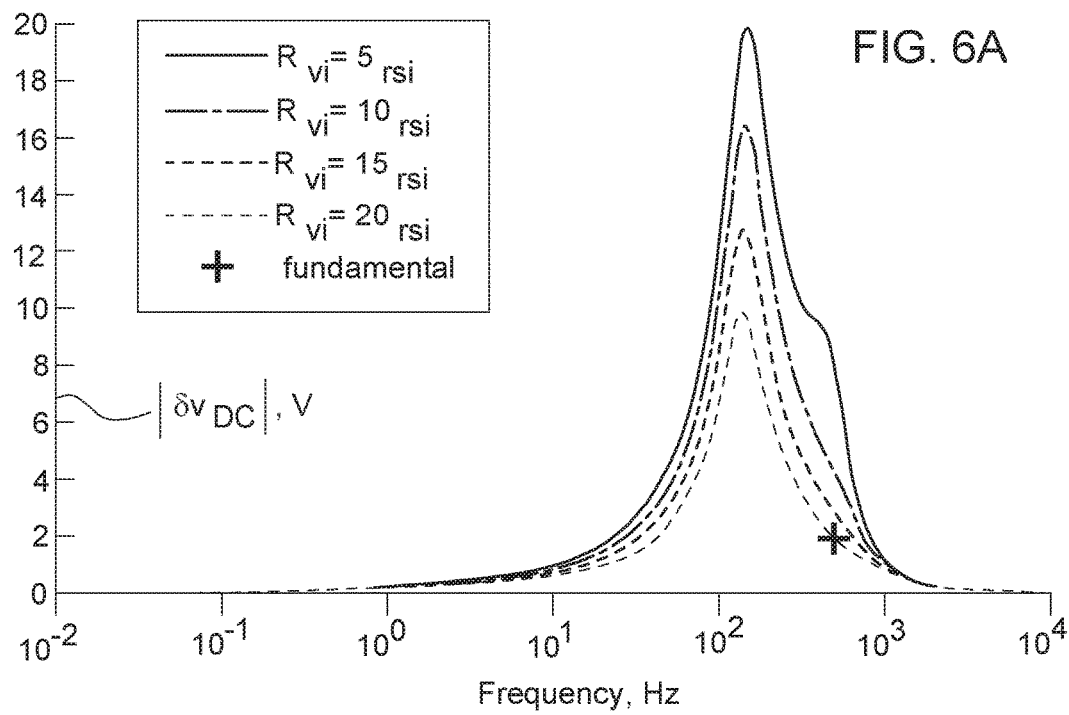
FIGS. 6A-6B illustrate an impact adjusting a virtual resistance on dc-link voltage oscillations.
Figure 6B:
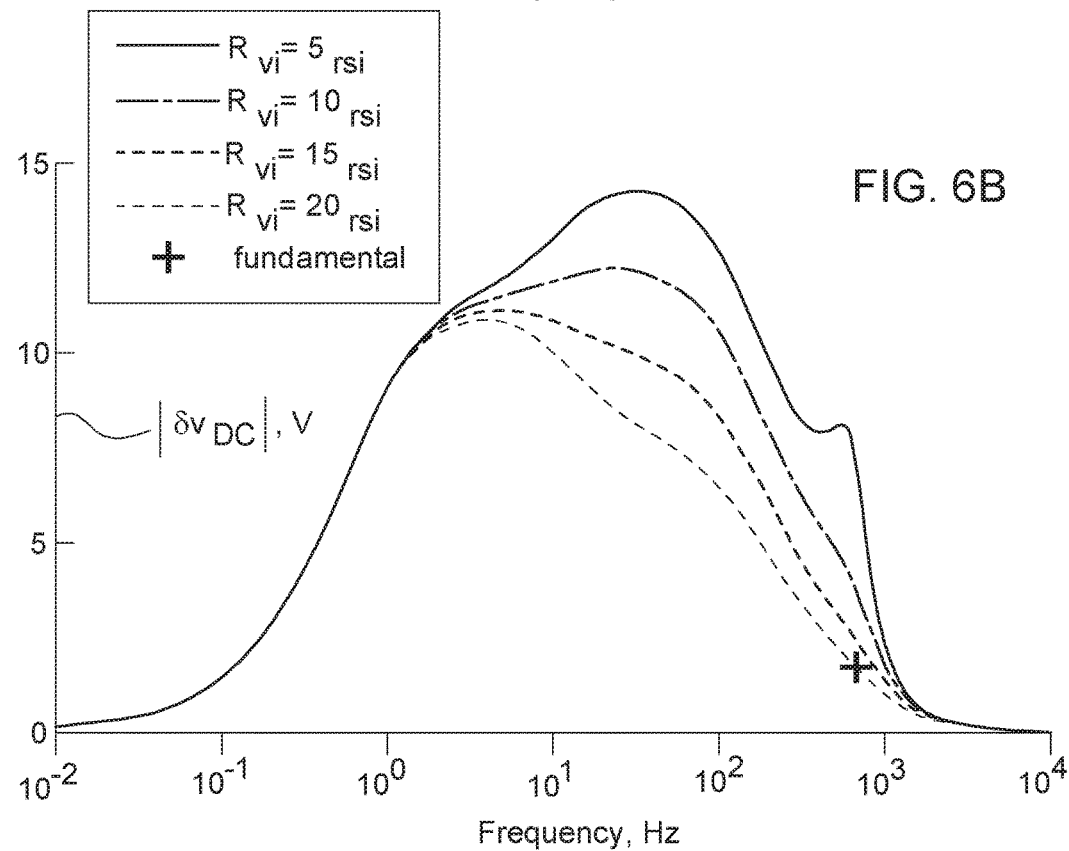

FIGS. 6A-6B illustrate an impact of position error in a resolver attached to the generator drive 105 with different versions of the voltage controller 205 as described above (generation of the torque command $T_{e1}^*$ and the power command $P_1^*$, respectively), on dc-link voltage oscillations $\delta v_{dc}$ by adjusting the virtual resistances $R_{v1}$ and $R_{v2}$, where i refers to the machine (i.e., i is 1 for the generator drive 105 and is 2 for the traction drive 155). Note that the virtual resistance is varied in both the generator drive 105 and the traction drive 155 simultaneously (i.e., $R_{v1}$ and $R_{v2}$).

FIG. 6B is obtained when the voltage controller 205 is modeled with the virtual conductance $G_a=10G$ and the bandwidth $\omega_{bv}=10$ Hz. As shown in FIGS. 6A-6B, the dc-link voltage oscillation $\delta v_{dc}$ is less when $R_{vi}$ is $20r_{si}$ than when $R_{vi}$ is $15r_{si}$, $10r_{si}$ or $5r_{si}$.

FIG. 7 is a block diagram of an electronic data processing system consistent with the processing system 120, according to an example embodiment. While only the processing system 120 is illustrated, it should be understood that the processing system 170 has the same structure. In another example embodiment, the processing system 170 does not have a voltage controller if the processing system 170 obtains a direct torque command instead of a voltage command.

Thus, in FIG. 7, it should be noted the voltage controller 205 is illustrated in dashed lines because the processing system 170 does not utilize the voltage controller 205.

In FIG. 7, the electronic data processing system 120 includes an electronic data processor 764, a data bus 762, a data storage device 760, and one or more data ports (768, 770, 772, 774 and 776). The data processor 764, the data storage device 760 and one or more data ports are coupled to the data bus 762 to support communications of data between or among the data processor 764, the data storage device 760 and one or more data ports. The data processor 764 is configured to execute computer-readable instructions stored in the data storage device 760 to perform the functions described above with respect to FIGS. 1-6B. Moreover, while some components are illustrated as being part of the data storage device 760, it should be understood that some components may be just hardware and/or a combination of hardware and software. For example, the power converter 225 may be considered hardware and software. In this example, the data processor 764 is configured to execute the computer-readable instructions to control the hardware portion of the power converter 225.

In an example embodiment, the data processor 764 may include an electronic data processor, a microprocessor, a microcontroller, a programmable logic array, a logic circuit, an arithmetic logic unit, an application specific integrated circuit, a digital signal processor, a proportional-integral-derivative (PID) controller, or another data processing device.

The data storage device 760 may include any magnetic, electronic, or optical device for storing data. For example, the data storage device 760 may include an electronic data storage device, an electronic memory, non-volatile electronic random access memory, one or more electronic data registers, data latches, a magnetic disc drive, a hard disc drive, an optical disc drive, or the like.

As shown in FIG. 7, the data ports include a first data port 768, a second data port 770, a third data port 772, a fourth data port 774 and a fifth data port 776. While in FIG. 7, 5 data ports are shown, any suitable number of data ports may be used. Each data port may include a transceiver and buffer memory, for example. In an example embodiment, each data port may include any serial or parallel input/output port.

In an example embodiment as illustrated in FIG. 7, the first data port 768 is coupled to a vehicle data bus 718. In turn, the vehicle data bus 718 is coupled to a controller 766. In one configuration, the second data port 770 may be coupled to the gate drivers 788 (e.g., connected to one of power converters 225 and 275); the third data port 772 may be coupled to an external sensor 715 (e.g., one of sensors 230 and 280); the fourth data port 774 may be coupled to an analog-to-digital converter 722; and the fifth data port 776 may be coupled to a terminal voltage feedback module 708. The analog-to-digital converter 722 may be coupled to the sensor and convert analog measurements into digital values.

In an example embodiment of the data processing system 120, a controller 766 is associated with or supported by the first data port 768 of the electronic data processing system 120. The first data port 768 may be coupled to a vehicle data bus 718, such as a controller area network (CAN) data bus. The vehicle data bus 718 may provide data bus messages with torque commands to the controller 766 via the first data port 768. The operator of a vehicle may generate the torque commands via a user interface, such as a throttle, a pedal, or other control devices.

The data processor 764 may communicate with the gate drivers 788, the sensor 715, the analog-to-digital converter 722, the terminal voltage feedback module 708 and the vehicle data bus 718 over the data bus 762.

Figure 8:
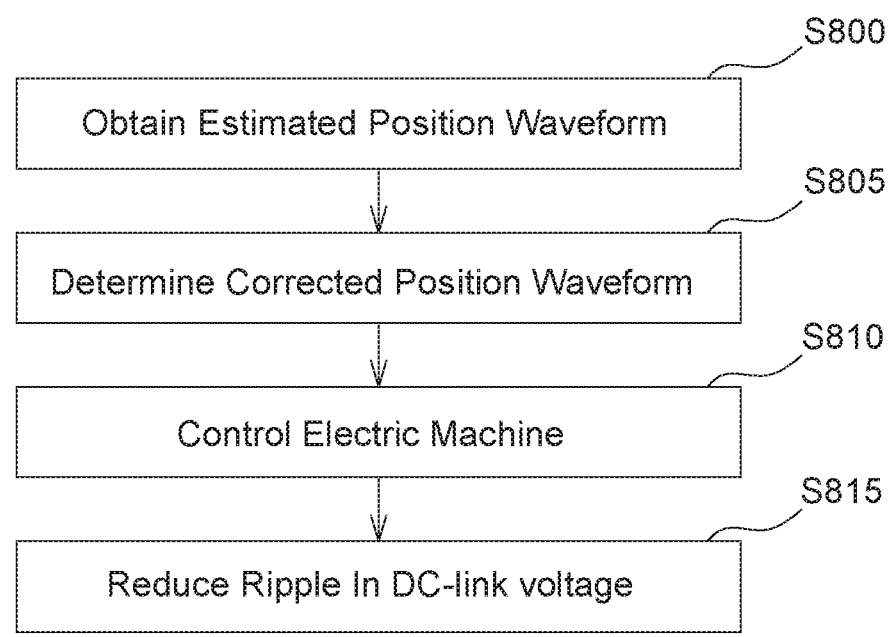

FIG. 8 illustrates a method of controlling an electric machine (e.g., the generator 110 or the traction device 160). The method of FIG. 7 may be performed by a processing system such as the processing system 120 or the processing system 170.

At S800, the processing system obtains an estimated position waveform. For example, the sensor 230 generates the estimated/measured position signal $\theta_r$ which includes an error signal part $\varepsilon$ and an actual position waveform $\theta_r$. As an example, the sensor 230 is one of an encoder, a hall sensor and a resolver.

At S805, the processing system determines a corrected position waveform $\hat{\theta}_r$ based on the estimated/measured position signal $\theta_r$. At S805, the processing system determines first and second coefficients (i.e., $\hat{\alpha}$ and $\hat{\beta}$) and reduces at least one frequency component of the error signal using the first coefficient $\hat{\alpha}$ and the second $\hat{\beta}$ to determine the corrected position waveform $\hat{\theta}_r$. For example, the processing system may reduce the fundamental component and any additional harmonics or subharmonics as described above with respect to equations (26)-(42).

To determine the first coefficient and the second coefficient, the processing system may identify at least one frequency component of the error signal and then determine the estimated first coefficient and the estimated second coefficient based on the identified at least one frequency component.

At S810, the processing system controls the electric machine using the corrected position waveform. For example, the processing system generates three-phase voltages $v_{abc}$ for the electric machine based on the corrected position waveform $\hat{\theta}_r$.

Direct and quadrature representations of the input voltage command $v_{qd}^*$ may be obtained and transformed to the three-phase voltage command using the corrected position waveform $\hat{\theta}_r$.

Moreover, the processing system may obtain direct and quadrature representations of a current command and determine a corrected speed of the rotor using the corrected position waveform $\hat{\theta}_r$. The processing system may obtain the input voltage command $v_{qd}^*$ using the corrected speed of the rotor $\hat{\omega}_r$, the direct and quadrature representations of the current command $i_{qd}^*$, and direct and quadrature representations of an actual three-phase current $\hat{i}_{qd}$. The direct and quadrature representations of the actual three-phase current are based on the corrected position waveform.

The processing system may obtain a measured three-phase current $i_{abc}$ and transform the measured three-phase current $i_{abc}$ to direct and quadrature representations of an estimated current $\hat{i}_{qd}$ using the corrected position waveform $\hat{\theta}_r$.

The processing system may obtain direct and quadrature representations of a current command $i_{qd}^*$, generate a corrected speed of the rotor $\hat{\omega}_r$ using the corrected position waveform $\hat{\theta}_r$ and generate direct and quadrature representations of a voltage command $v_{qd}^*$ using the corrected speed of the rotor $\hat{\omega}_r$, the direct and quadrature representations of the current command $i_{qd}^*$ and direct and quadrature representations of an actual three-phase current $\hat{i}_{qd}$, the direct and quadrature representations of the actual three-phase current $\hat{i}_{qd}$ being based on the corrected position waveform $\hat{\theta}_r$.

At S815, a ripple in the DC-link voltage is reduced by the processing system, which may include increasing a virtual resistance of the electric machine. More specifically, the processing system determines the corrected position waveform $\hat{\theta}_r$ to reduce/mitigate a fundamental component and or harmonic/subharmonic components that cause a ripple in the DC-link voltage. The ripple is at least one of a base frequency of the error signal and twice the base frequency of the error signal.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

What is claimed is:

1. A method of controlling an electric machine, the method comprising:
   obtaining an estimated position waveform, the estimated position waveform being based on a position of a rotor of the electric machine, the estimated position waveform having an error signal and an actual position waveform;
   determining a corrected position waveform of the rotor based on the estimated position waveform, the determining the corrected position waveform of the rotor includes,
      determining an estimated first coefficient and an estimated second coefficient, and
      reducing at least one frequency component of the error signal using the estimated first coefficient and the estimated second coefficient to determine the corrected position waveform;
   controlling the electric machine based on the corrected position waveform; and
   reducing a ripple in a direct current (DC) link voltage based on the controlling, wherein the reducing the ripple in the direct current (DC) link voltage includes increasing a virtual resistance of the electric machine.

2. The method of claim 1, wherein the determining the first coefficient and the second coefficient includes,
   obtaining the at least one frequency component of the error signal; and
   determining the estimated first coefficient and the estimated second coefficient based on the obtained at least one frequency component.

3. The method of claim 1, wherein the reducing the frequency component of the estimated position waveform reduces at least one of a sub-harmonic component and a harmonic component from the error signal of the estimated position waveform using the estimated first coefficient and the estimated second coefficient.

4. The method of claim 3, wherein the determining the estimated first coefficient and the estimated second coefficient determines the estimated first coefficient and the estimated second coefficient as:

$$\hat{\alpha}_y(s) = \frac{2}{y} f_{LPF}(s) L\{\sin y\hat{\theta}_r\}$$

-continued $$\hat{\beta}_y(s) = -\frac{2}{y} f_{LPF}(s) L\{\cos y\hat{\theta}_r\}$$

where $\hat{\theta}_r$ is a value of the estimated position waveform, $\hat{\alpha}_y$ is the estimated first coefficient for a $y^{th}$ harmonic, $\hat{\beta}_y$ is the estimated second coefficient for the $y^{th}$ harmonic, $f_{LPF}(s)$ is a transfer function of a low-pass filter and $L\{\}$ is a Laplace transform.

5. The method of claim 4, wherein a bandwidth of the low-pass filter is at least twenty times smaller than a corresponding frequency component of the at least one frequency component of the error signal.

6. The method of claim 5, wherein the corresponding frequency component of the error signal is a minimum frequency component of the error signal.

7. The method of claim 1, wherein the estimated position waveform is based on an output from a position sensor.

8. The method of claim 7, wherein the position sensor is one of an encoder, a hall sensor and a resolver.

9. The method of claim 7, wherein the determining the corrected position waveform determines the corrected position waveform using a processing device, the processing device being external to the position sensor.

10. The method of claim 1, wherein the ripple is at least one of a base frequency of the error signal and twice the base frequency of the error signal.

11. The method of claim 1, wherein the controlling the electric machine based on the corrected position waveform includes,
obtaining direct and quadrature representations of an input voltage command; and
transforming the direct and quadrature representations of the input voltage command to a three-phase voltage command using the corrected position waveform.

12. The method of claim 11, further comprising:
obtaining direct and quadrature representations of a current command; and
estimating a speed of the rotor using the corrected position waveform, wherein the obtaining the input voltage command obtains the input voltage command using the estimated speed of the rotor, the direct and quadrature representations of the current command, and direct and quadrature representations of an actual three-phase current, the direct and quadrature representations of the actual three-phase current being based on the corrected position waveform.

13. The method of claim 1, wherein the controlling the electric machine based on the corrected position waveform includes,
obtaining a measured three-phase current; and
transforming the measured three-phase current to direct and quadrature representations of an estimated current using the corrected position waveform.

14. The method of claim 13, further comprising:
obtaining direct and quadrature representations of a current command;
estimating a speed of the rotor using the corrected position waveform; and
generating direct and quadrature representations of a voltage command using the estimated speed of the rotor, the direct and quadrature representations of the current command and direct and quadrature representations of an actual three-phase current, the direct and quadrature representations of the actual three-phase current being based on the corrected position waveform.

15. The method of claim 1, further comprising:
determining a power command based on a virtual conductance, wherein the controlling further controls the electric machine based on the power command.

16. A system for controlling an electric machine comprising:
a memory storing computer-readable instructions; and
at least one processing device configured to execute the computer-readable instructions to cause the system to,
obtain an estimated position waveform, the estimated position waveform being based on a position of a rotor of the electric machine, the estimated position waveform having an error signal and an actual position waveform,
determine a corrected position waveform of the rotor based on the estimated position waveform by,
determining an estimated first coefficient and an estimated second coefficient, and
reducing at least one frequency component of the error signal using the estimated first coefficient and the estimated second coefficient to determine the corrected position waveform,
control the electric machine based on the corrected position waveform, and
reduce a ripple in a direct current (DC) link voltage based on the controlling and by increasing a virtual resistance of the electric machine.

17. The system of claim 16, wherein the at least one processing device is configured to execute the computer-readable instructions to cause the system to,
obtain the at least one frequency component of the error signal; and
determine the estimated first coefficient and the estimated second coefficient based on the obtained at least one frequency component.

18. The system of claim 16, the at least one processing device is configured to execute the computer-readable instructions to cause the system to reduce at least one of a sub-harmonic component and a harmonic component from the error signal of the estimated position waveform using the estimated first coefficient and the estimated second coefficient.

19. The system of claim 18, wherein the at least one processing device is configured to execute the computer-readable instructions to cause the system to determine the estimated first coefficient and the estimated second coefficient as:

$$\hat{\alpha}_y(s) = \frac{2}{y} f_{LPF}(s) L\{\sin y\hat{\theta}_r\}$$

$$\hat{\beta}_y(s) = -\frac{2}{y} f_{LPF}(s) L\{\cos y\hat{\theta}_r\}$$

where $\hat{\theta}_r$ is a value of the estimated position waveform, $\hat{\alpha}_y$ is the estimated first coefficient for a $y^{th}$ harmonic, $\hat{\beta}_y$ is the estimated second coefficient for the $y^{th}$ harmonic, $f_{LPF}(s)$ is a transfer function of a low-pass filter and $L\{\}$ is a Laplace transform.

20. The system of claim 19, wherein a bandwidth of the low-pass filter is at least twenty times smaller than a corresponding frequency component of the at least one frequency component of the error signal.

21. The system of claim 20, wherein the corresponding frequency component of the error signal is a minimum frequency component of the error signal.

22. The system of claim 16, wherein the estimated position waveform is based on an output from a position sensor.

23. The system of claim 22, wherein the position sensor is one of an encoder, a hall sensor and a resolver.

24. The system of claim 22, wherein the at least one processing device is external to the position sensor.

25. The system of claim 16, wherein the ripple is at least one of a base frequency of the error signal and twice the base frequency of the error signal.

26. The system of claim 16, wherein the at least one processing device is configured to execute the computer-readable instructions to cause the system to,
 obtain direct and quadrature representations of an input voltage command; and
 transform the direct and quadrature representations of the input voltage command to a three-phase voltage command using the corrected position waveform.

27. The system of claim 26, wherein the at least one processing device is configured to execute the computer-readable instructions to cause the system to,
 obtain direct and quadrature representations of a current command;
 estimate a speed of the rotor using the corrected position waveform; and
 obtain the input voltage command using the estimated speed of the rotor, the direct and quadrature representations of the current command, and direct and quadrature representations of an actual three-phase current, the direct and quadrature representations of the actual three-phase current being based on the corrected position waveform.

28. The system of claim 16, wherein the at least one processing device is configured to execute the computer-readable instructions to cause the system to,
 obtain a measured three-phase current; and
 transform the measured three-phase current to direct and quadrature representations of an estimated current using the corrected position waveform.

29. The system of claim 28, wherein the at least one processing device is configured to execute the computer-readable instructions to cause the system to,
 obtain direct and quadrature representations of a current command;
 estimate a speed of the rotor using the corrected position waveform; and
 generate direct and quadrature representations of a voltage command using the estimated speed of the rotor, the direct and quadrature representations of the current command and direct and quadrature representations of an actual three-phase current, the direct and quadrature representations of the actual three-phase current being based on the corrected position waveform.

30. The system of claim 16, wherein the at least one processing device is configured to execute the computer-readable instructions to cause the system to determine a power command based on a virtual conductance and further control the electric machine based on the power command.

* * * * *